United States Patent … US 7,653,124 B2
Tian et al. … Jan. 26, 2010

(54) MONITORING DIFFERENTIAL PHASE-SHIFTED KEYING DEMODULATION

(75) Inventors: Cechan Tian, Plano, TX (US); Takao Naito, Plano, TX (US)

(73) Assignee: Fujitsu Limited, Kawasaki (JP)

(*) Notice: Subject to any disclaimer, the term of this patent is extended or adjusted under 35 U.S.C. 154(b) by 564 days.

(21) Appl. No.: 11/538,158

(22) Filed: Oct. 3, 2006

(65) Prior Publication Data

US 2008/0080854 A1    Apr. 3, 2008

(51) Int. Cl.
    *H04B 3/46*    (2006.01)
(52) U.S. Cl. ....................................... 375/224
(58) Field of Classification Search ................ 375/224, 375/225, 226, 227, 228; 324/513, 523, 527, 324/528, 750, 755, 763, 765; 370/247, 251; 379/21, 26.02, 27.04; 700/39, 81; 702/120, 702/121, 67; 714/30, 36, 715, 734, 738; 398/9, 25
See application file for complete search history.

(56) References Cited

U.S. PATENT DOCUMENTS

| | | | | |
|---|---|---|---|---|
| 4,773,083 | A  * | 9/1988 | Baumbach et al. | 375/328 |
| 6,396,605 | B1   | 5/2002 | Heflinger et al. | 359/154 |
| 6,445,477 | B1   | 9/2002 | Madsen et al. | 359/187 |
| 6,469,817 | B1   | 10/2002 | Heflinger | 359/189 |
| 7,359,314 | B2 * | 4/2008 | Sakata et al. | 370/210 |
| 2005/0047780 | A1 | 3/2005 | Hoshida et al. | 398/33 |
| 2006/0147218 | A1* | 7/2006 | Domagala | 398/155 |
| 2007/0065157 | A1* | 3/2007 | Katagiri et al. | 398/155 |
| 2007/0297043 | A1* | 12/2007 | Kao et al. | 359/337 |

* cited by examiner

*Primary Examiner*—Sam K Ahn
(74) *Attorney, Agent, or Firm*—Baker Botts L.L.P.

(57) ABSTRACT

Monitoring a demodulator includes repeating the following for each demodulating module of one or more demodulating modules of a demodulator: receiving a first signal and a second signal from a demodulating module; introducing a relative delay between the first signal and the second signal; and asynchronously sampling the first signal and the second signal to yield samples. Image data representing the samples associated with the demodulating modules is generated. The image data indicates one or more mismatches of the demodulator.

22 Claims, 11 Drawing Sheets

+10% TEST GRAPH

*FIG. 7A*

-10% TEST GRAPH

FIG. 7B

REFERENCE GRAPH

FIG. 7C

+10% TEST GRAPH

*FIG. 8A*

-5ps TEST GRAPH

*FIG. 8B*

REFERENCE GRAPH

FIG. 8C

+5ps TEST GRAPH

FIG. 9A

-5° TEST GRAPH

*FIG. 9B*

REFERENCE GRAPH

*FIG. 9C*

+5° TEST GRAPH

MONITORING DIFFERENTIAL PHASE-SHIFTED KEYING DEMODULATION

TECHNICAL FIELD

This invention relates generally to the field of signal communication and more specifically to monitoring differential phase-shifted keying demodulation.

BACKGROUND

Signals may be modulated according to a differential phase-shifted keying (DPSK) modulation technique. According to the technique, changes in the phase of a signal are used to represent bit data. A modulator at a transmitter translates a bit sequence into phase changes that represent the bit sequence. A demodulator at a receiver translates the phase changes to retrieve the bit sequence.

The demodulator may be monitored to determine whether the demodulator is properly demodulating the signal. Known techniques for monitoring a demodulator, however, are not satisfactory in certain situations. It is generally desirable to have satisfactory demodulator monitoring.

SUMMARY OF THE DISCLOSURE

In accordance with the present invention, disadvantages and problems associated with previous techniques for monitoring a demodulator may be reduced or eliminated.

According to one embodiment of the present invention, monitoring a demodulator includes repeating the following for each demodulating module of one or more demodulating modules of a demodulator: receiving a first signal and a second signal from a demodulating module; introducing a relative delay between the first signal and the second signal; and asynchronously sampling the first signal and the second signal to yield samples. Image data representing the samples associated with the demodulating modules is generated. The image data indicates one or more mismatches of the demodulator.

Certain embodiments of the invention may provide one or more technical advantages. A technical advantage of one embodiment may be that a demodulator may be monitored by asynchronously sampling demodulator signals at a rate lower than the data rate of the signals. Sampling at a lower rate may place less demand on the timing requirements of the monitoring system.

Another technical advantage of one embodiment may be that different types of mismatches of the demodulator may be detected. For example, a bit rate mismatch, a demodulator phase mismatch, a detector delay mismatch, and/or an amplitude imbalance may be detected.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 10 of the drawings, like numerals being used for like and corresponding parts of the various drawings.

Figures 1, 2:
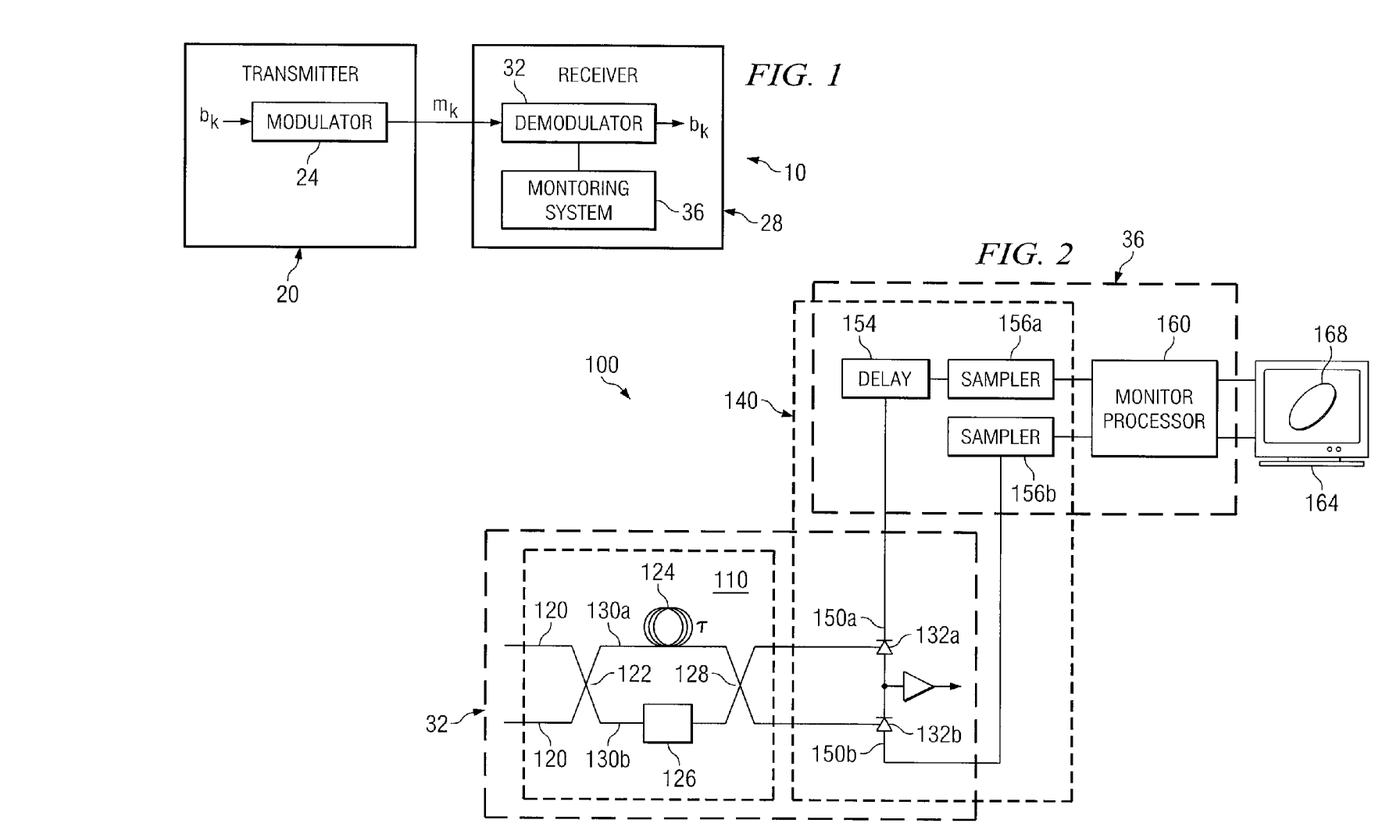
FIG. 1 is a block diagram illustrating one embodiment of a system for communicating a signal according to a differential phase-shifted keying (DPSK) modulation technique.
FIG. 2 is a block diagram illustrating an embodiment of a system that includes a monitoring system that may be used with the system of FIG. 1.

FIG. 1 is a block diagram illustrating one embodiment of a system 10 for communicating a signal according to a differential phase-shifted keying (DPSK) modulation technique. According to the embodiment, features of a demodulator 32 of system 10 may be matched to provide effective demodulation. For example, the delay of the modulator arms of demodulator 32 may be matched with the inverse of the data rate of the signal. A mismatch may occur if the features are not appropriately matched. System 10 includes a monitoring system 36 that may monitor demodulator 32 to detect mismatches.

According to one embodiment, system 10 communicates signals. A signal may refer to an optical signal transmitted as light pulses comprising photons. An optical signal may have a frequency of approximately 1550 nanometers, and a data rate of, for example, 10, 20, 30, 40, or over 40 gigabits per second. A signal may communicate information in packets. A packet may comprise a bundle of data organized in a specific way for transmission. A packet may carry any suitable information such as voice, data, audio, video, multimedia, other information, or any combination of the preceding.

System 10 includes components that may have any suitable elements operable to perform the operations of the component. For example, a component may comprise logic, an interface, a memory, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

According to the illustrated embodiment, system 10 includes a transmitter 20 operable to communicate a signal to a receiver 28. Transmitter 20 includes a modulator 24 that encodes the signal according to DPSK modulation. Receiver 28 includes a demodulator 32 that decodes the encoded signal and a monitoring system 36 that monitors demodulator 32.

According to the embodiment, modulator 24 receives a signal with input bits $b_k$ for time slots k. Modulator 24 encodes bits $b_k$ to yield modulated signal $m_k$. Modulator 24 may comprise any suitable modulator, for example, a Mach-Zehner modulator. Modulator 24 may have a light source that emits a continuous wave light beam, and may modulate the light beam to encodes bits $b_k$.

Bits $b_k$ may be encoded according to DPSK modulation, where phase shifts between successive symbols represent bits $b_k$. According to n-phase-shifted keying (n-PSK) modulation, n different levels of phase shifts may be used to encode p bits per symbol, where $n=2^p$. As an example, according to 4-PSK, or differential quadrature phase-shifted keying (DQPSK), four phase differences are used to encode two bits per symbol. In one case, phase shifts 0°, 90°, 180°, and −90° may be used to encode bit sequences "00", "01", "11", and "10", respectively.

Transmitter 20 transmits modulated signal $m_k$ to receiver 28. Demodulator 32 of receiver 28 demodulates signal $m_k$ to recover bits $b_k$. To demodulate signal $m_k$, demodulator 32 compares the phase shifts between successive symbols. Demodulator 32 may split signal $m_k$ to yield multiple signals traveling on demodulator arms of demodulator 32. A signal of the multiple signals may be delayed by one symbol to yield a delayed signal. The delayed signal and a non-delayed signal may be overlapped to compare the phases of successive symbols. The phases may be compared by constructively and destructively interfering the overlapped signals. Demodulator 32 may include photodetectors that detect the interference and generate a detector signal representing the interference.

According to one embodiment, features of demodulator 32 may be matched to provide effective demodulation. A mismatch may occur when the features are not appropriately matched. Monitoring system 36 may monitor demodulator 32 to detect mismatches.

Monitoring system 36 may monitor demodulator 32 for mismatches in any suitable manner. According to one embodiment, monitoring system 36 receives signals $S_i$ from demodulator 32. Monitoring system 36 introduces a relative delay between signals $S_1$ and $S_2$. The delay allows for sampling at a point of the waveform of signal $S_1$ that does not correspond to the point of the waveform at which signal $S_2$ is sampled. For example, signal $S_1$ may be sampled at the peak of the waveform, while signal $S_2$ may be sampled at a point other than the peak of the waveform. Monitoring system 36 asynchronously samples the signals. Asynchronous sampling may refer to sampling at a rate that is not equivalent to the data rate, for example, less than the data rate. Monitoring system 36 then generates a graph of the samples, which may be used to detect mismatches. An example of monitoring system 36 is described in more detail with reference to FIG. 2.

Modifications, additions, or omissions may be made to system 10 without departing from the scope of the invention. The components of system 10 may be integrated or separated according to particular needs. Moreover, the operations of system 10 may be performed by more, fewer, or other devices. Additionally, operations of system 10 may be performed using any suitable logic. As used in this document, "each" refers to each member of a set or each member of a subset of a set.

FIG. 2 is a block diagram illustrating an embodiment of a system 100 that includes monitoring system 36 that may be used with system 10 of FIG. 1. According to the embodiment, monitoring system 36 may monitor demodulator 32 of system 10 to detect mismatches of demodulator 32. In the illustrated embodiment, demodulator 32 may be used to demodulate a DPSK signal.

Demodulator 32 may include one or more demodulating modules 110. According to the illustrated embodiment, demodulator 32 includes a demodulating module 110. Demodulating module 110 includes an input 120, a coupler 122, demodulator arms 130, a symbol delay 124, a phase delay 126, a coupler 128, and photodetectors 132 coupled as shown. Input 120 receives an input signal, which may be encoded according to DPSK modulation. Coupler 124 splits the input signal to yield signals that travel along demodulator arms 130 to coupler 128.

Symbol delay 124 of demodulator arm 130a introduces a relative symbol delay between the signals. The difference may be one symbol length, and may be selected to align the signals for constructive and destructive interference. Phase delay 126 of demodulator arm 130b introduces a relative phase delay between the signals. The phase delay allows for comparison of the phases corresponding to successive symbols. Any suitable phase delay may be introduced, such as a phase delay that introduces a phase difference equivalent to the phase differences between phase levels.

Coupler 128 combines the signals from demodulator arms 130. Photodetectors 132 detect constructive and destructive interference of the combined signals, and generate a detector signal representing the interference. Photodetectors 132 may comprise photodiodes.

Monitoring system 36 may be used to detect mismatches of demodulator 32. As a first example, the delay of the demodulator arms of demodulator 32 may be matched to be approximately the inverse of the data rate. A bit rate mismatch may occur if the delay of the demodulator arms is not approximately the inverse of the data rate. As a second example, the delay of the demodulator arms may be matched with the wavelength of the light source to yield satisfactory constructive and destructive interference. A demodulator phase mismatch may occur if the delay of the demodulator arms does not match the wavelength of the laser.

As a third example, the delays of the detector outputs may be matched to be substantially equivalent to yield a differential detector output. A detector delay mismatch may occur if the delays of the detector outputs are not substantially equivalent. As a fourth example, the photodetectors may be matched to be substantially equally sensitive. An amplitude imbalance may indicate that the detectors are not approximately equally sensitive.

Monitoring system 36 may include one or more monitoring modules 140, where a monitoring module 140 monitors a demodulating module 110, and a display 164. According to the illustrated embodiment, monitoring system 36 includes a monitoring module 140.

According to the embodiment, monitoring module 140 includes signal paths 150, a delay 154, samplers 156, and a monitor processor 160 coupled as shown. Paths 150 receive signals $S_i$ from photodetectors 132 of demodulator 32. According to the illustrated embodiment, path 150a receives signal $S_i$ from photodetector 132a, and path 150b receives signal $S_2$ from photodetector 132b.

Delay 154 introduces a relative delay between signals $S_1$ and $S_2$ by delaying signal $S_1$. The delay may allow for sampling of signals $S_1$ and $S_2$ at different points of their waveforms. For example, signal $S_1$ may be sampled at the peak of the waveform, while signal $S_2$ may be sampled at a point other than the peak of the waveform. Any suitable delay may be introduced, for example, a delay of one bit for DPSK and a delay of two bits for DQPSK.

Samplers 156 sample signals $S_1$ and $S_2$ to collect samples of bit sequences over time. According to one embodiment, samplers 156 asynchronously sample signals $S_1$ and $S_2$. Asynchronous sampling may refer to sampling at a sampling rate that is not equivalent to the data rate, for example, less than the data rate. For example, signals of a gigahertz data rate may be sampled may be sampled at a megahertz sampling rate. Since different points of the waveforms of signals $S_1$ and $S_2$ are being sampled, signals $S_1$ and $S_2$ can be sampled at a sampling rate that is less than the data rate.

Monitor processor 160 collects samples from samplers 156 in order to detect relative changes that may indicate mismatches. Monitor processor 160 may generate image data that represents the accumulation of samples over time. The image data may be used to generate a graph 168 that may indicate relative changes in the samples. Examples of graphs 168 are described in more detail with reference to FIGS. 4 through 10.

Display 164 may comprise any suitable output device operable to output graph 168. Examples of display 164 may comprise a visual display, a printer, or other suitable device operable to output graph 168.

Modifications, additions, or omissions may be made to monitoring system 36 without departing from the scope of the invention. The components of monitoring system 36 may be integrated or separated according to particular needs. Moreover, the operations of monitoring system 36 may be performed by more, fewer, or other devices. Additionally, operations of monitoring system 36 may be performed using any suitable logic.

Figure 3:
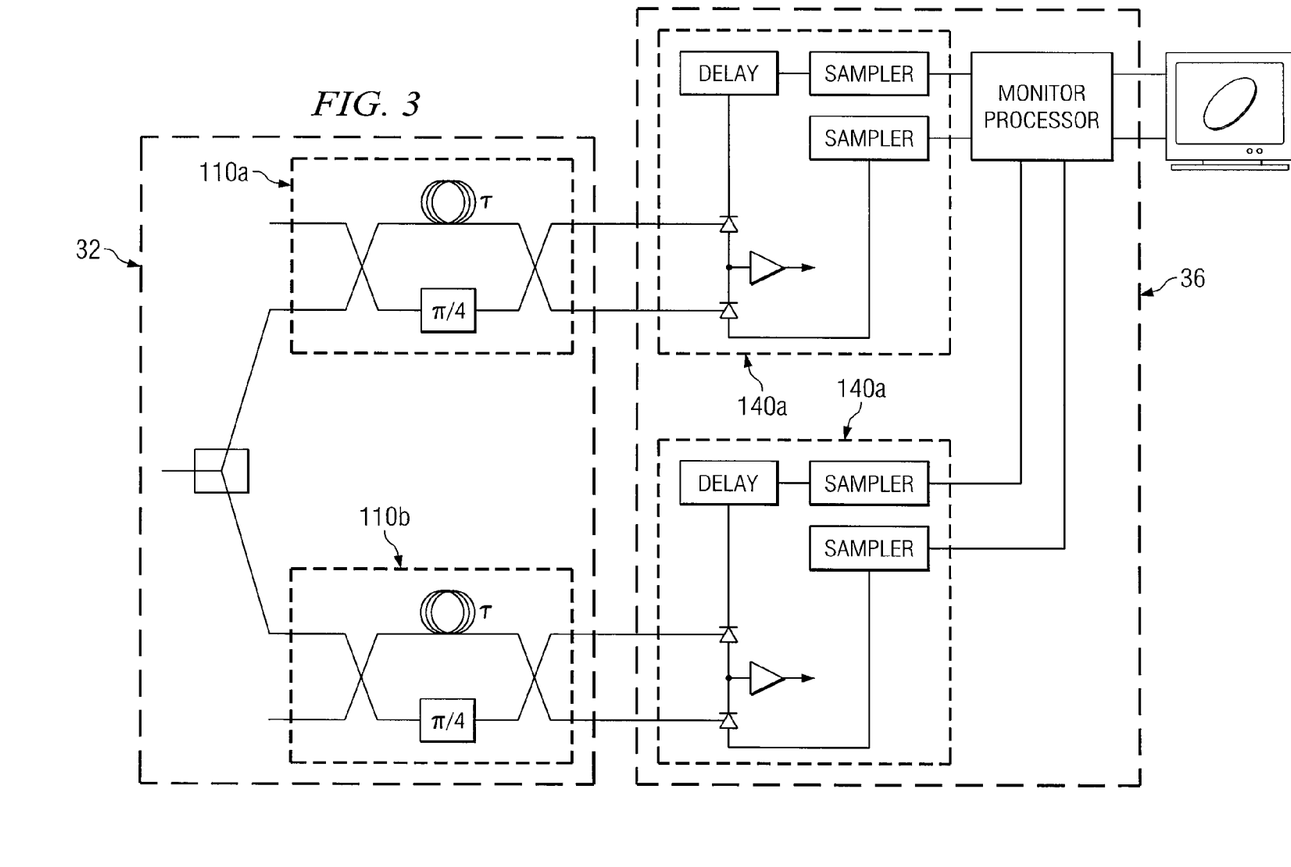
FIG. 3 is a block diagram illustrating another embodiment of a system that includes a monitoring system that may be used with the system of FIG. 1.

FIG. 3 is a block diagram illustrating another embodiment of a system 100 that includes monitoring system 36 that may be used in system 10 of FIG. 1. In the illustrated embodiment, demodulator 32 may be used to demodulate a DQPSK signal. According to the illustrated embodiment, demodulator 32 includes demodulating modules 110*a* and 110*b*. Monitoring system 36 includes monitoring modules 140*a* and 140*b*. Monitoring module 140*a* monitors demodulating module 110*a*, and monitoring module 140*b* monitors demodulating module 110*b*.

FIGS. 4 through 10 illustrate examples of reference and test graphs. According to one embodiment, a coordinate axis of a graph may correspond to a signal from a photodetector 132. For example, the x-coordinate axis may correspond to a signal from detector X, and the y-coordinate axis may correspond to a signal from detector Y. A coordinate axis may be used to represent the amplitude of the corresponding signal.

According to one embodiment, a reference graph may indicate appropriate matching of the features of demodulator 32, and may represent samples from an appropriately matched demodulator 32. Test graphs may indicate the features of a monitored demodulator 32, and may represent samples from demodulator 32 operating under actual conditions. The test graphs may be compared with the reference graph to detect relative changes indicating mismatching.

Modifications, additions, or omissions may be made to the graphs without departing from the scope of the invention. For example, the coordinate axes and axis units of the graphs may be selected according to particular needs.

Figure 4:
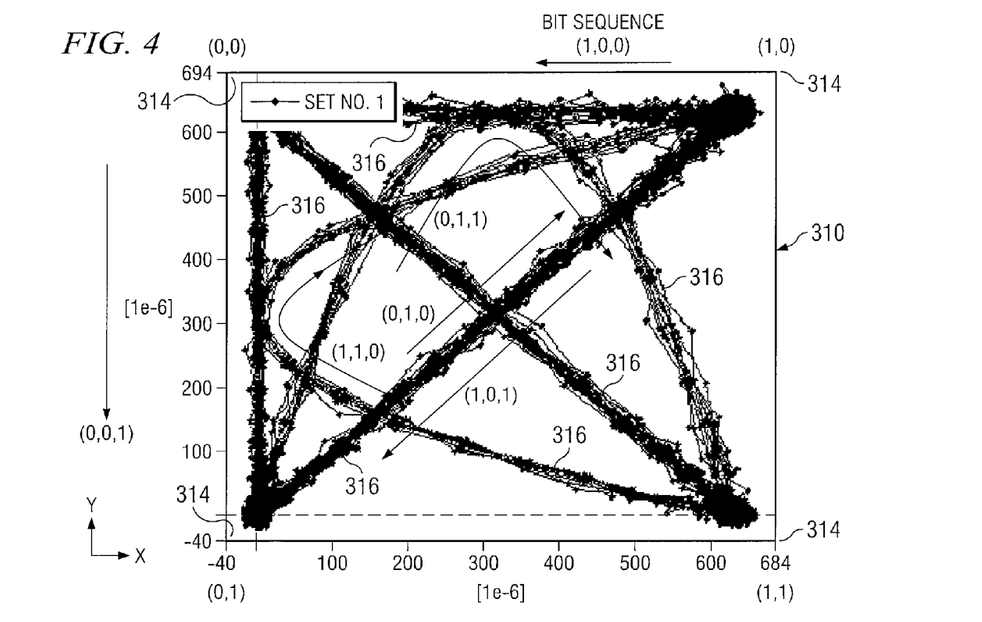
FIG. 4 illustrates an example of a reference graph for a DPSK modulator.

FIG. 4 illustrates an example of a reference graph 310 for a DPSK modulator 32. Corners 314 represent points (0,0), (0,1), (1,0), and (1,1) as shown. Axes 316 represent bit sequences from one point to another point. According to the illustrated embodiment, axes 316 represent bit sequences (0,0,1), (0,1,0), (1,0,0), (0,1,1), (1,0,1), and (1,1,0). For example, axis 316 from point (0,0) to point (0,1) represents bit sequence (0,0,1). Axis 316 representing bit sequence (p,q,r) may be expressed as axis p-q-r. Diagonal 316 from point (p,q) to point (r,s) may be expressed as diagonal pq-rs.

Figure 5:
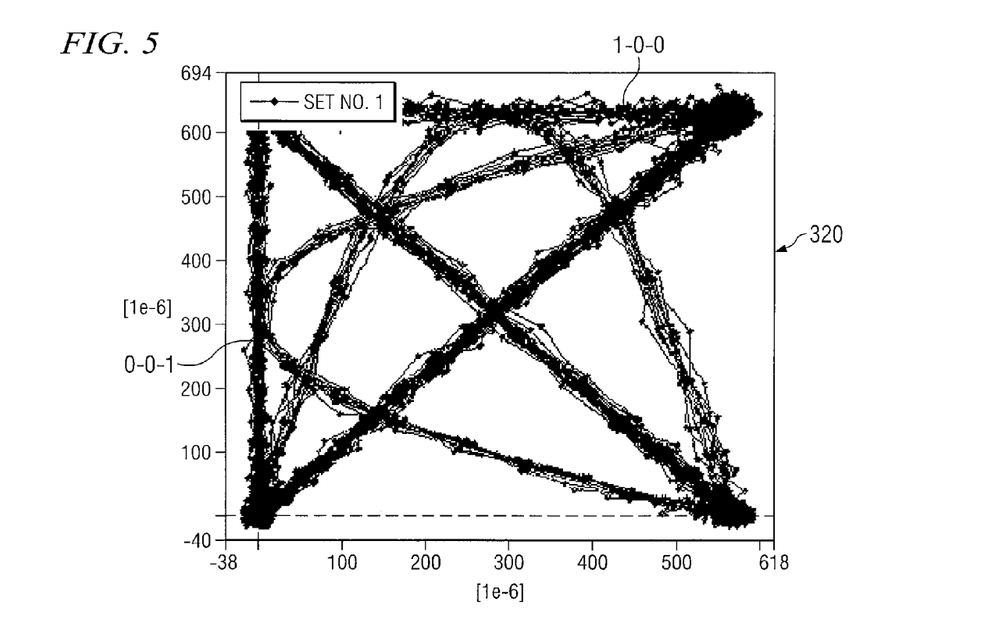
FIG. 5 illustrates an example of a test graph indicating an amplitude imbalance.

FIG. 5 illustrates an example of a test graph 320 indicating an amplitude imbalance. Detectors may be matched to be substantially equally sensitive. An amplitude imbalance may indicate the detectors are not approximately equally sensitive.

According to the embodiment, axis 1-0-0 represents the amplitude range of detector X, and axis 0-0-1 represents the amplitude range of detector Y. Axis 1-0-0 is shorter than axis 0-0-1, indicating that detector X may be less sensitive than detector Y.

Figure 6A:
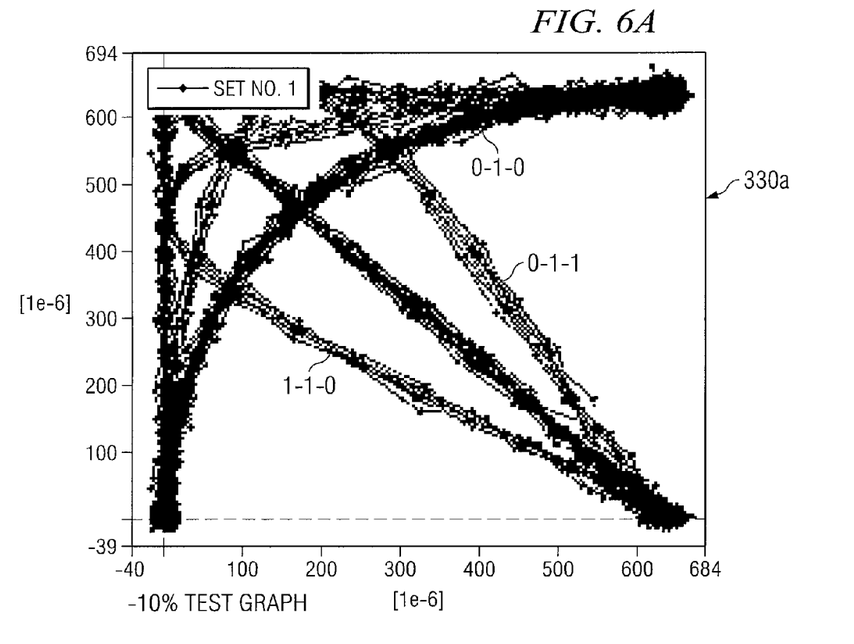
FIG. 6 illustrates examples of a reference graph and test graphs indicating bit rate mismatches.
Figure 6B:
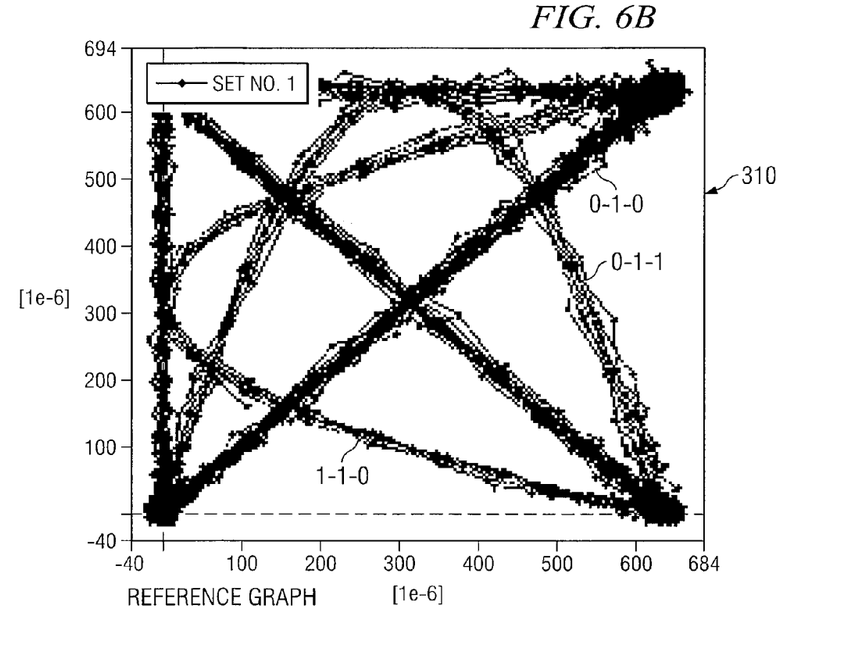
Figure 6C:
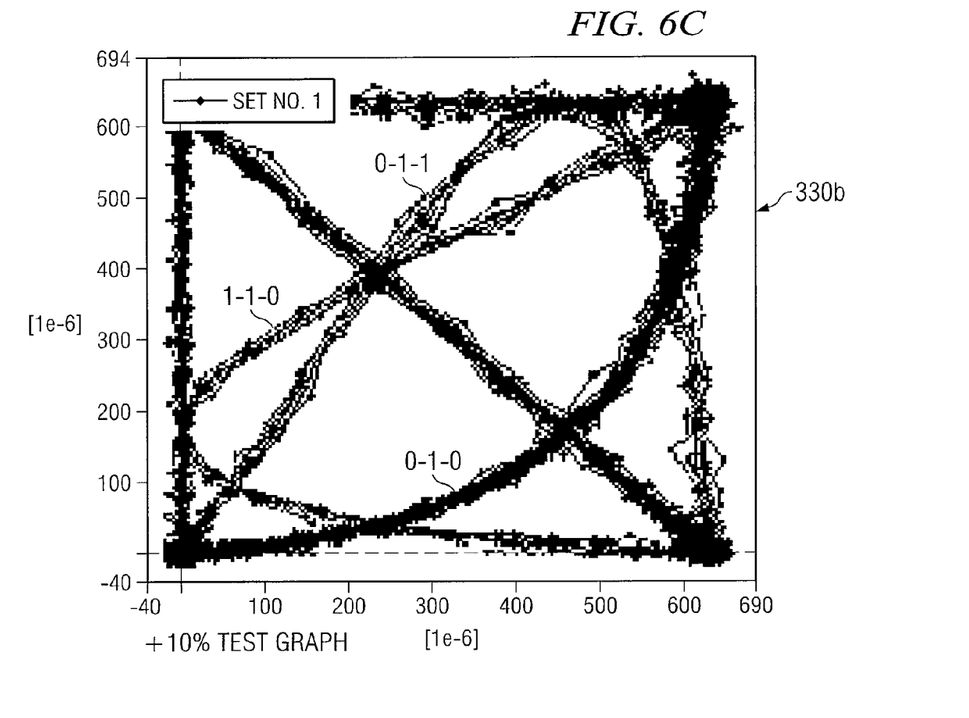

FIG. 6 illustrates reference graph 310 and examples of test graphs 330 indicating bit rate mismatches. The delay of the demodulator arms of demodulator 32 may be matched to be approximately the inverse of the data rate. A bit rate mismatch may occur when the delay of the demodulator arms is not approximately the inverse of the data rate.

In reference graph 310, axis 0-1-0 (which coincides with axis 1-0-1) is substantially linear. In test graphs 330, however, axes 0-1-0 are not substantially linear, indicating a bit rate mismatch. Axis 0-1-0 of test graph 330*a* is curved towards point (0,0), indicating a negative mismatch. In the example, test graph 330*a* indicates a −10% mismatch. Axis 0-1-0 of test graph 330*b* is curved towards point (1,1), indicating a positive mismatch. In the example, test graph 330*b* indicates a +10% mismatch. Axes 0-1-1 and 1-1-0 of test graphs 330 also deviate from axes 0-1-1 and 1-1-0 of reference graph 310.

Figure 7A:
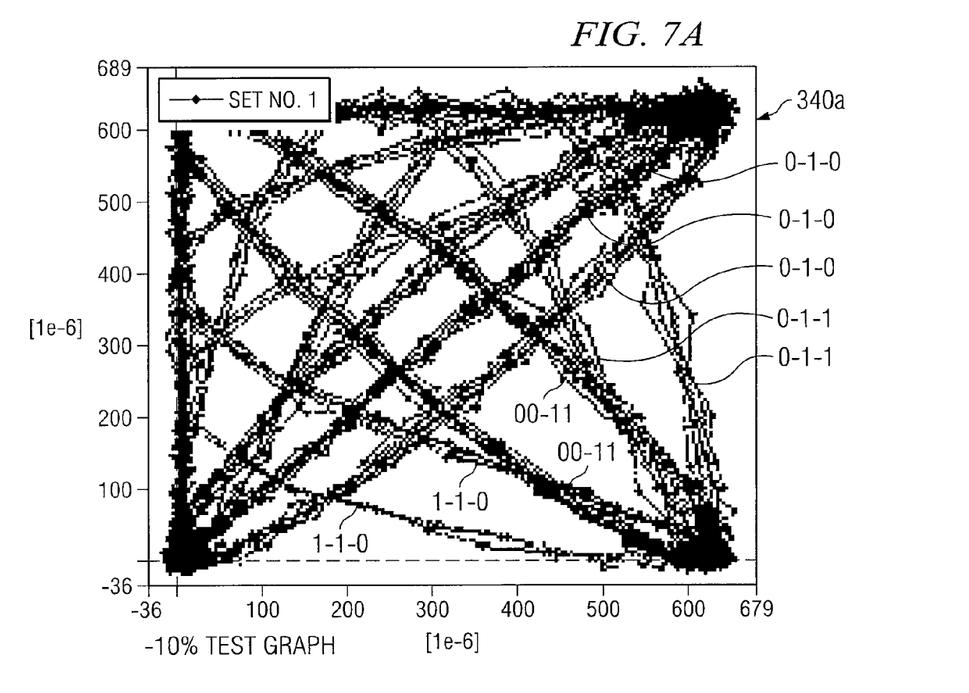
FIG. 7 illustrates examples of a reference graph and test graphs indicating demodulator phase mismatches.
Figure 7B:
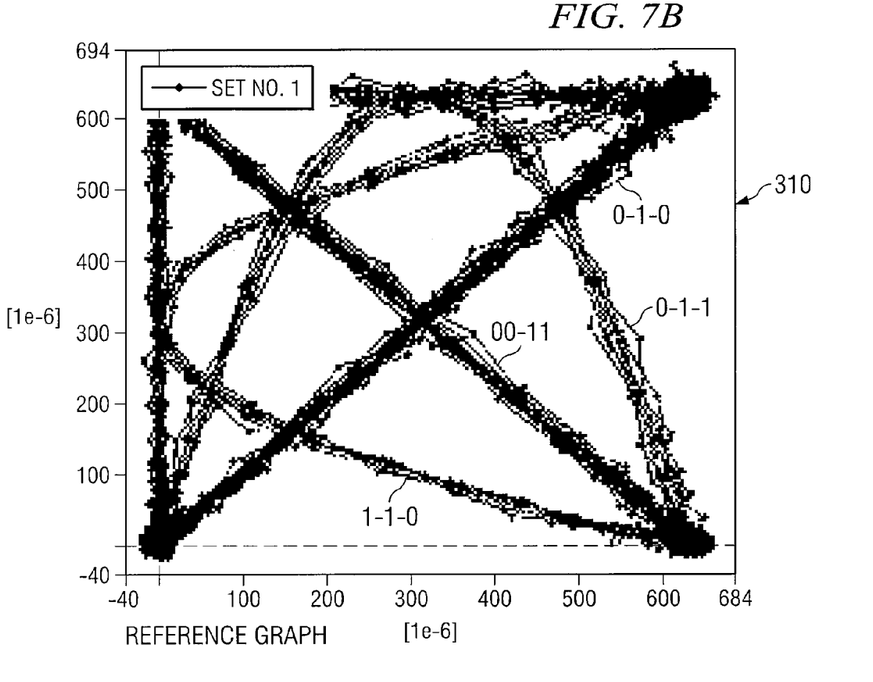
Figure 7C:
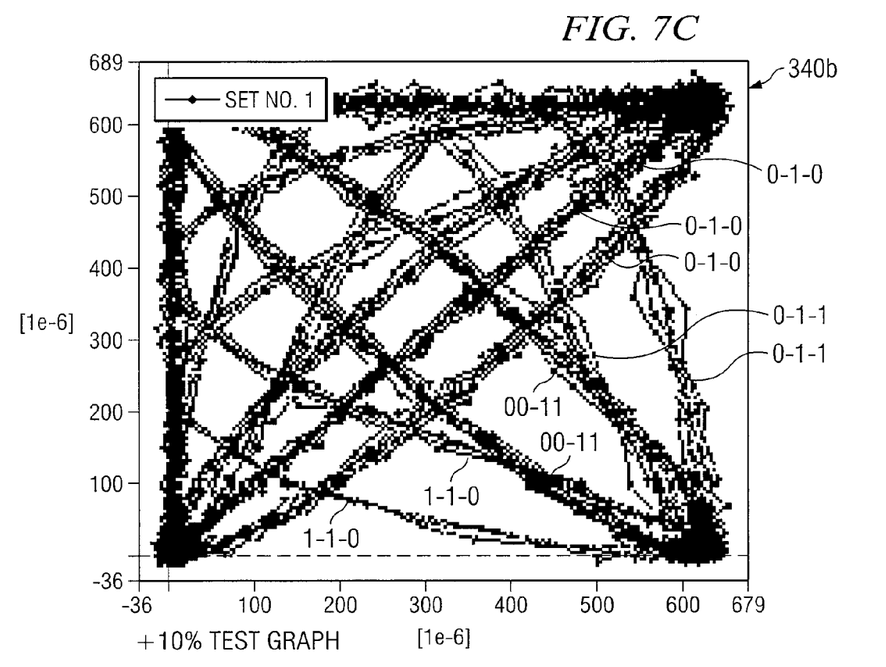

FIG. 7 illustrates reference graph 310 and examples of test graphs 340 indicating demodulator phase mismatches. The delay of the demodulator arms may be matched with the wavelength of the light source to yield satisfactory constructive and destructive interference. A demodulator phase mismatch may occur if the delay of the demodulator arms does not match the wavelength of the laser.

In reference graph 310, axis 0-1-0 and diagonal 00-11 are substantially single lines. In test graphs 340, however, axes 0-1-0 and diagonals 00-11 are not substantially single lines, indicating a demodulator phase mismatch.

Each axis 0-1-0 of test graphs 340 forms an elongated ellipse from points (0,1) to (1,0) about a line from points (0,1) to (1,0). Each diagonal 00-11 of test graphs 340 forms an elongated ellipse from points (0,0) to (1,1). In the example, test graph 340*a* indicates a −10° mismatch, and test graph 340*b* indicates a +10° mismatch.

Axes 0-1-1 and 1-1-0 of test graphs 340 also deviate from axes 0-1-1 and 1-1-0 of reference graph 310.

Figure 8A:
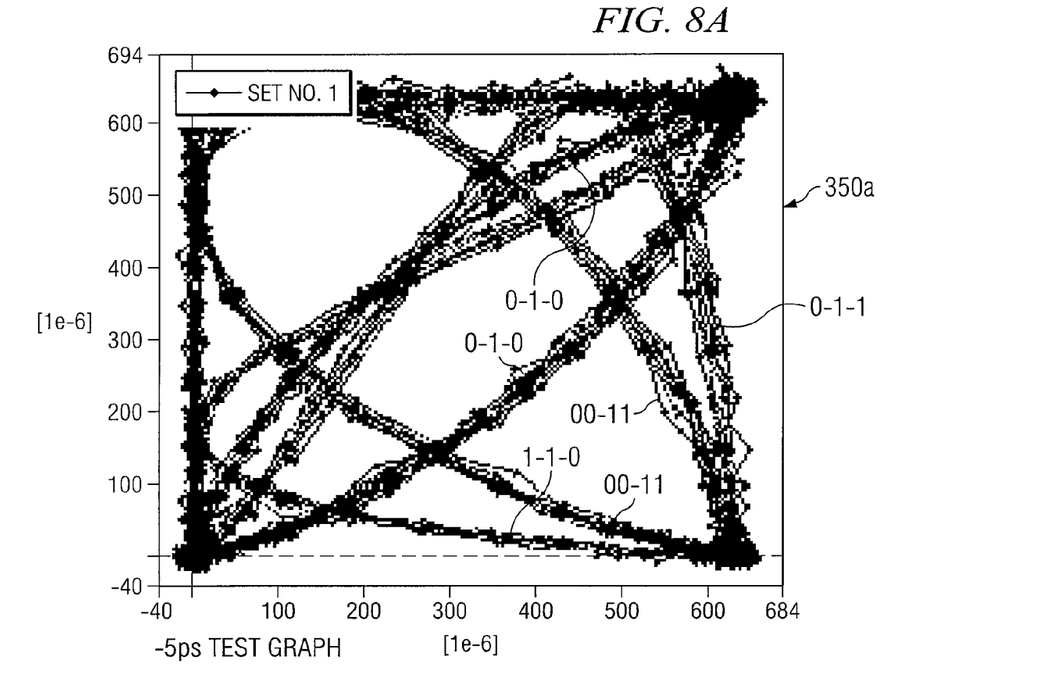
FIG. 8 illustrates examples of a reference graph and test graphs indicating detector delay mismatches.
Figure 8B:
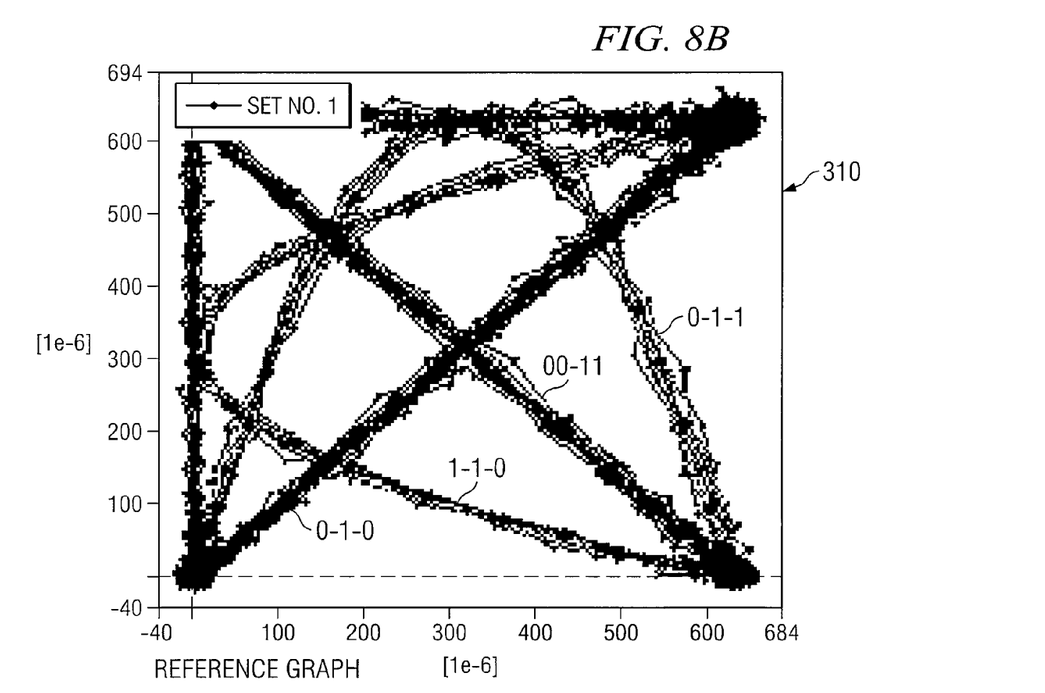
Figure 8C:
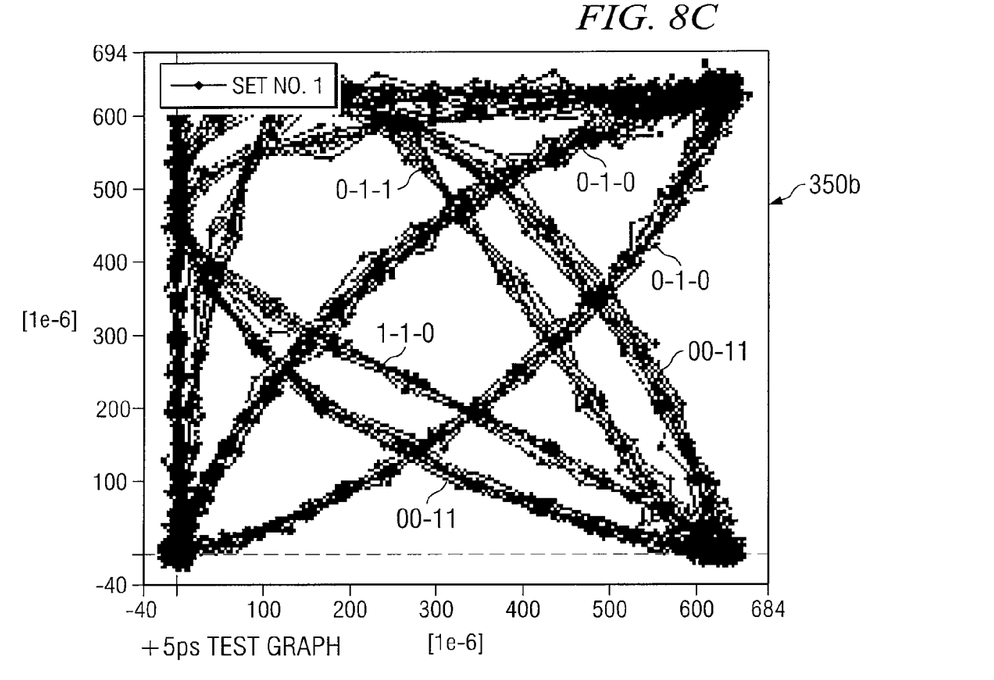

FIG. 8 illustrates reference graph 310 and examples of test graphs 350 indicating detector delay mismatches. The delays of the detector outputs may be matched to be substantially equivalent to yield a differential detector output. A detector delay mismatch may occur if the delays of the detector outputs are not substantially equivalent.

In reference graph 310, axis 0-1-0 and diagonal 00-11 are substantially single lines. Axes 0-1-1 and 1-1-0 of reference graph 310 also exhibit distinctive shapes. In test graphs 350, however, axes 0-1-0 and diagonals 00-11 are not substantially single lines, and axes 0-1-1 and 1-1-0 do not exhibit the distinctive shapes, indicating a detector delay mismatch.

In test graph 350a, axis 0-1-0 of forms an elongated ellipse from points (0,1) to (1,0), and diagonal 00-11 forms an elongated ellipse from points (0,0) to (1,1). Moreover, axes 0-1-1 and 1-1-0 are flattened in the direction indicated by axis 0-1-0, indicating a negative mismatch. In the example, test graph 350a indicates a −5 picosecond (ps) mismatch.

In test graph 350b, axis 0-1-0 of forms an elongated ellipse from points (0,1) to (1,0), and diagonal 00-11 forms an elongated ellipse from points (0,0) to (1,1). Moreover, axes 0-1-1 and 1-1-0 are flattened in the direction indicated by diagonal 00-11, indicating a positive mismatch. In the example, test graph 350a indicates a +5 ps mismatch.

Figure 9A:
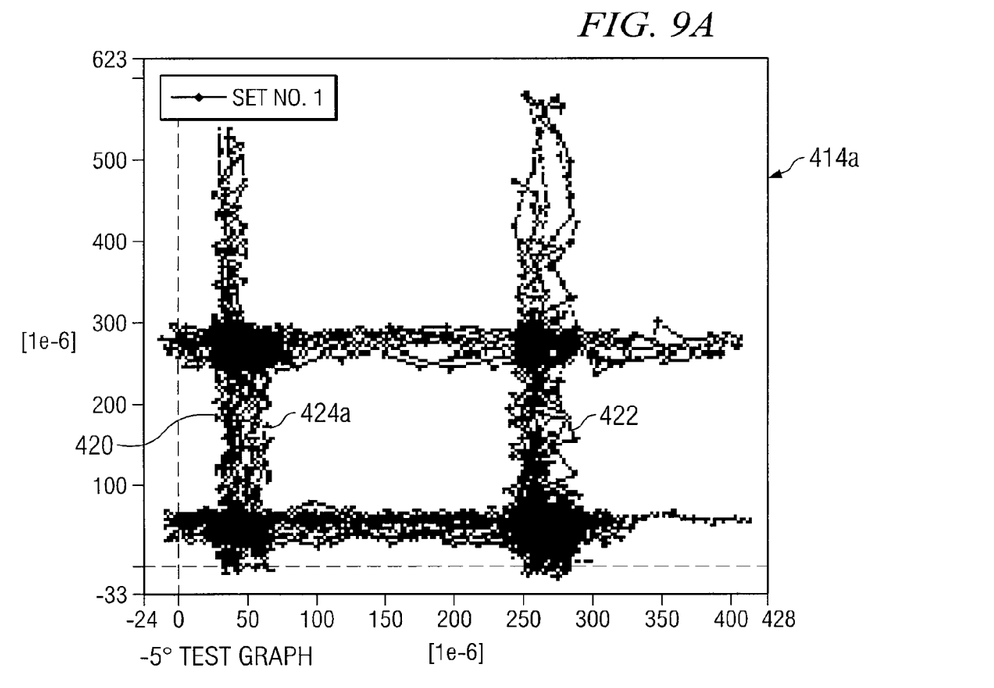
FIG. 9 illustrates examples of a reference graph and test graphs indicating demodulator phase mismatches for a DQPSK demodulator.
Figure 9B:
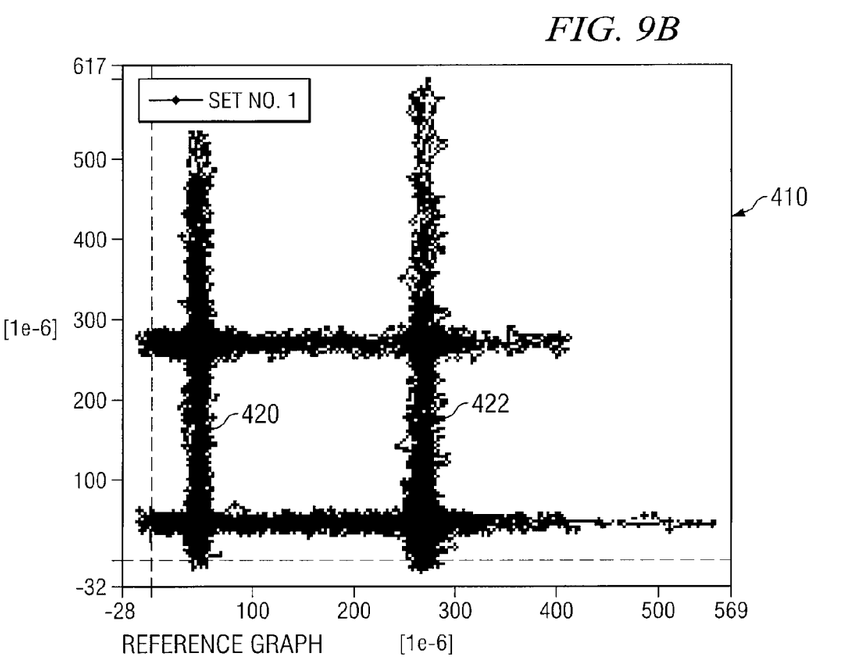
Figure 9C:
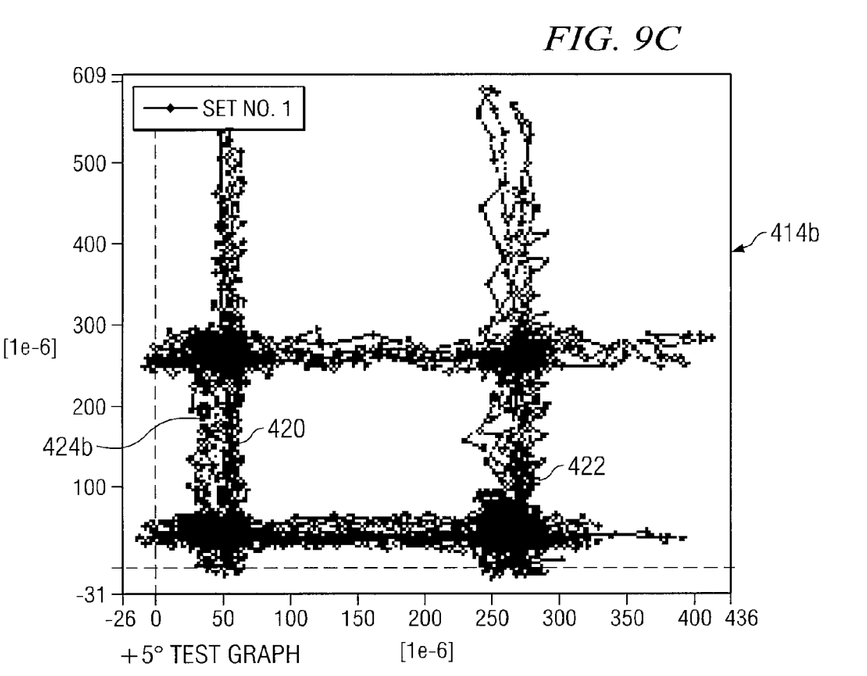

FIG. 9 illustrates examples of a reference graph 410 and test graphs 414 indicating demodulator phase mismatches for a DQPSK demodulator 32. In reference graph 410, axes 420 and 422 are substantially singular lines. In test graphs 414, axes 420 and 422 are not substantially singular lines, indicating demodulator phase mismatches. In test graph 414a, axis 420 has an additional line 424a located in a direction of increasing x, indicating a negative mismatch. In the example, test graph 414a indicates a −5° mismatch. In test graph 414b, axis 420 has an additional line 424b located in a direction of decreasing x, indicating a positive mismatch. In the example, test graph 414a indicates a +5° mismatch.

Figure 10A:
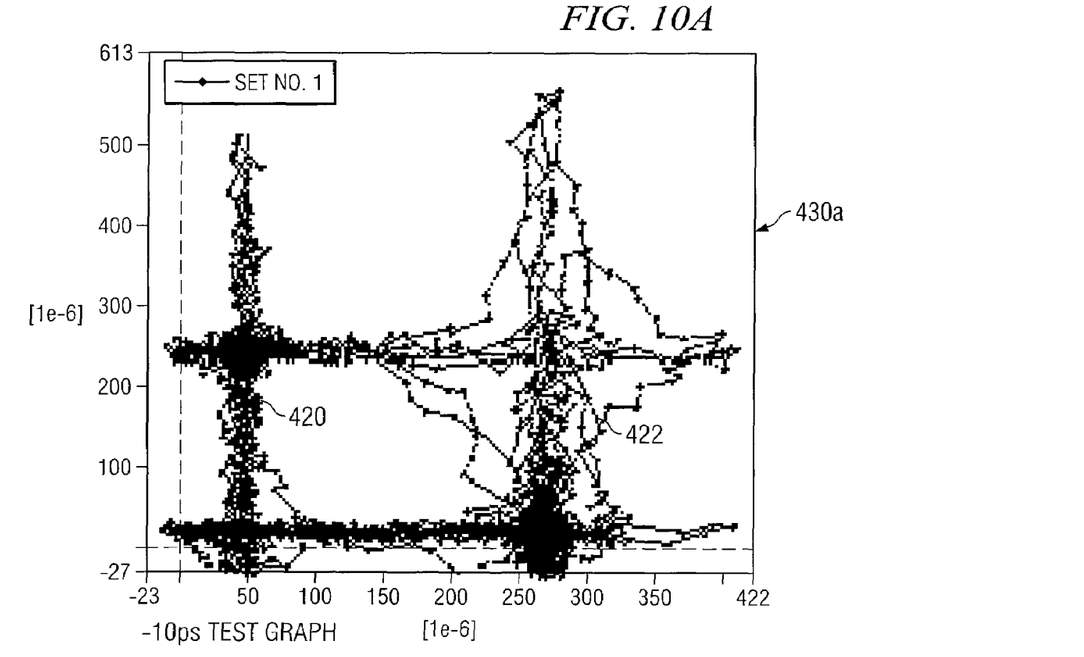
FIG. 10 illustrates examples of a reference graph and test graphs indicating detector delay mismatches.
Figure 10B:
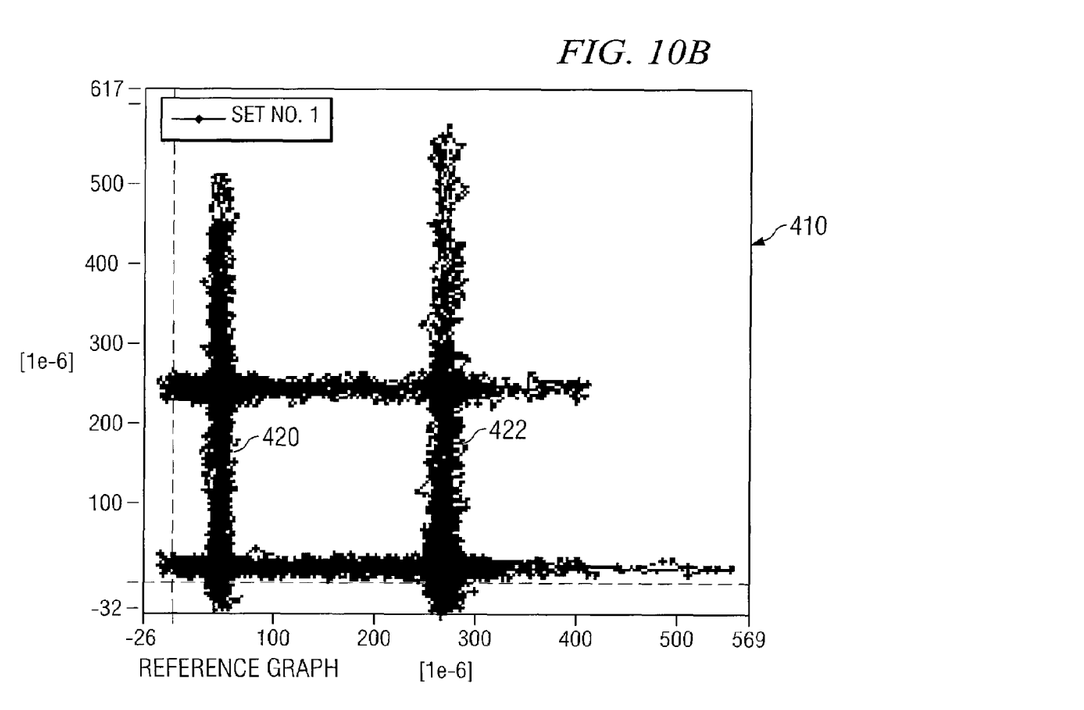
Figure 10C:
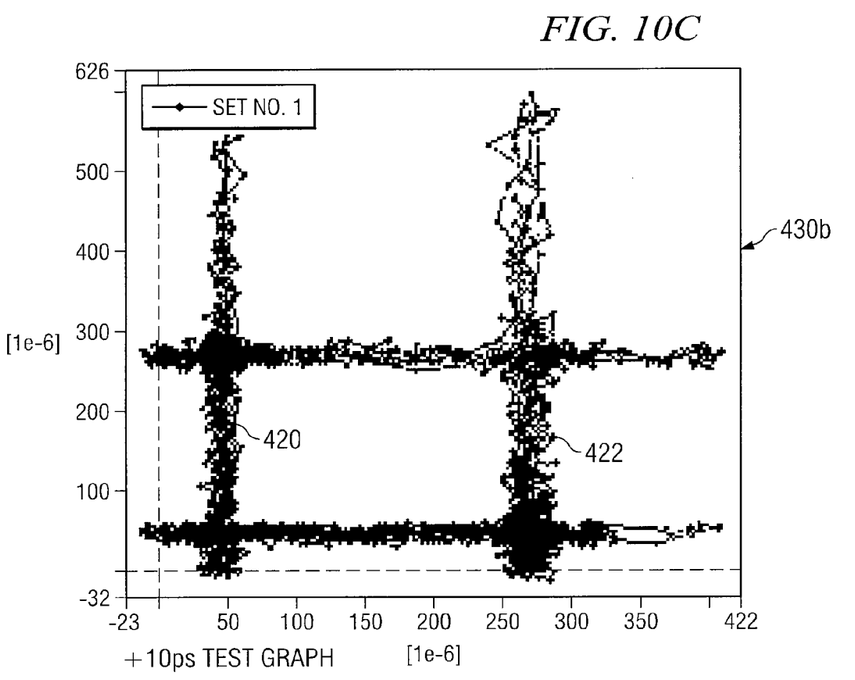

FIG. 10 illustrates reference graph 410 and examples of test graphs 430 indicating detector delay mismatches for a DQPSK demodulator 32. In reference graph 410, axes 420 and 422 are a specific distance apart. In test graphs 430, axes 420 and 422 are not the specific distance apart, indicating detector delay mismatches. In test graph 430a, the samples of axis 422 exhibit a great amount of scattering, more than that of axes 422 of reference graph 410 and of test graph 430b, indicating a negative mismatch. In the example, test graph 430a indicates a −10 ps mismatch. In test graph 430b, the samples of axis 422 exhibit a moderate amount of scattering, more than that of axis 422 of reference graph 410 but less than that of axis 422 of test graph 430b, indicating a positive mismatch. In the example, test graph 430b indicates a +10 ps mismatch.

Certain embodiments of the invention may provide one or more technical advantages. A technical advantage of one embodiment may be that a demodulator may be monitored by asynchronously sampling demodulator signals at a rate lower than the data rate of the signals. Sampling at a lower rate may place less demand on the timing requirements of the monitoring system.

Another technical advantage of one embodiment may be that different types of mismatches of the demodulator may be detected. For example, a bit rate mismatch, a demodulator phase mismatch, a detector delay mismatch, and/or an amplitude imbalance may be detected.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A monitoring system operable to monitor a demodulator, comprising:
one or more monitoring modules, a monitoring module operable to monitor a demodulating module of one or more demodulating modules of a demodulator, the monitoring module comprising:
a plurality of paths operable to receive a first signal and a second signal from the demodulating module;
a delay operable to introduce a relative delay between the first signal and the second signal; and
a plurality of samplers operable to asynchronously sample the first signal and the second signal to yield a plurality of samples; and
a monitor processor operable to generate image data representing the plurality of samples from the one or more monitoring modules, the image data indicating one or more mismatches of the demodulator.

2. The monitoring system of claim 1, wherein:
the first signal and the second signal are associated with a data rate; and
the plurality of samplers are operable to asynchronously sample at a sampling rate less than the data rate.

3. The monitoring system of claim 1, wherein:
the first signal has a first waveform;
the second signal has a second waveform; and
the relative delay allows for sampling at a first point of the first waveform and at a second point of the second waveform, the first point not corresponding to the second point.

4. The monitoring system of claim 1, wherein the image data yields a test graph operable to be compared with a reference graph, the reference graph indicating one or more matched features, a difference between the test graph and the reference graph indicating a mismatch of the one or more mismatches.

5. The monitoring system of claim 1, wherein:
the first signal is received from a first detector of the demodulating module;
the second signal is received from a second detector of the demodulating module; and
the image data yields a test graph, the test graph comprising:
a first coordinate axis representing the first detector; and
a second coordinate axis representing the second detector.

6. The monitoring system of claim 1, wherein the image data yields a test graph, the test graph comprising a plurality of axes, an axis representing a bit sequence of the first signal and the second signal.

7. The monitoring system of claim 1, wherein the image data indicates a bit rate mismatch.

8. The monitoring system of claim 1, wherein the image data indicates a demodulator phase mismatch.

9. The monitoring system of claim 1, wherein the image data indicates a detector delay mismatch.

10. The monitoring system of claim 1, wherein the image data indicates an amplitude imbalance.

11. A monitoring method operable to monitor a demodulator, comprising:
repeating the following for each demodulating module of one or more demodulating modules of a demodulator:
receiving a first signal and a second signal from a demodulating module;
introducing a relative delay between the first signal and the second signal; and
asynchronously sampling the first signal and the second signal to yield a plurality of samples; and
generating image data representing the plurality of samples associated with the one or more demodulating modules, the image data indicating one or more mismatches of the demodulator.

12. The monitoring method of claim 11, wherein:
the first signal and the second signal are associated with a data rate; and
asynchronously sampling the first signal and the second signal further comprises:
asynchronously sampling at a sampling rate less than the data rate.

13. The monitoring method of claim 11, wherein:
the first signal has a first waveform;
the second signal has a second waveform; and
the relative delay allows for sampling at a first point of the first waveform and at a second point of the second waveform, the first point not corresponding to the second point.

14. The monitoring method of claim 11, wherein the image data yields a test graph operable to be compared with a reference graph, the reference graph indicating one or more matched features, a difference between the test graph and the reference graph indicating a mismatch of the one or more mismatches.

15. The monitoring method of claim 11, wherein:
the first signal is received from a first detector of the demodulating module;
the second signal is received from a second detector of the demodulating module; and
the image data yields a test graph, the test graph comprising:
a first coordinate axis representing the first detector; and
a second coordinate axis representing the second detector.

16. The monitoring method of claim 11, wherein the image data yields a test graph, the test graph comprising a plurality of axes, an axis representing a bit sequence of the first signal and the second signal.

17. The monitoring method of claim 11, wherein the image data indicates a bit rate mismatch.

18. The monitoring method of claim 11, wherein the image data indicates a demodulator phase mismatch.

19. The monitoring method of claim 11, wherein the image data indicates a detector delay mismatch.

20. The monitoring method of claim 11, wherein the image data indicates an amplitude imbalance.

21. A monitoring system operable to monitor a demodulator, comprising:
means for repeating the following for each demodulating module of one or more demodulating modules of a demodulator:
receiving a first signal and a second signal from a demodulating module;
introducing a relative delay between the first signal and the second signal; and
asynchronously sampling the first signal and the second signal to yield a plurality of samples; and
means for generating image data representing the plurality of samples associated with the one or more demodulating modules, the image data indicating one or more mismatches of the demodulator.

22. A monitoring system operable to monitor a demodulator, comprising:
one or more monitoring modules, a monitoring module operable to monitor a demodulating module of one or more demodulating modules of a demodulator, the monitoring module comprising:
a plurality of paths operable to receive a first signal and a second signal from the demodulating module, the first signal and the second signal associated with a data rate, the first signal having a first waveform, the second signal having a second waveform, the first signal received from a first detector of the demodulating module, the second signal received from a second detector of the demodulating module;
a delay operable to introduce a relative delay between the first signal and the second signal, the relative delay allowing for sampling at a first point of the first waveform and at a second point of the second waveform, the first point not corresponding to the second point; and
a plurality of samplers operable to:
asynchronously sample the first signal and the second signal to yield a plurality of samples; and
asynchronously sample at a sampling rate less than the data rate; and
a monitor processor operable to generate image data representing the plurality of samples from the one or more monitoring modules, the image data:
indicating one or more mismatches of the demodulator, the image data indicating at least one of a bit rate mismatch, a demodulator phase mismatch, a detector delay mismatch, and an amplitude imbalance; and
yielding a test graph operable to be compared with a reference graph, the reference graph indicating one or more matched features, a difference between the test graph and the reference graph indicating a mismatch of the one or more mismatches, the test graph comprising:
a first coordinate axis representing the first detector;
a second coordinate axis representing the second detector; and
a plurality of axes, an axis representing a bit sequence of the first signal and the second signal.

* * * * *

UNITED STATES PATENT AND TRADEMARK OFFICE
CERTIFICATE OF CORRECTION

| | | |
|---|---|---|
| PATENT NO. | : 7,653,124 B2 | |
| APPLICATION NO. | : 11/538158 | |
| DATED | : January 26, 2010 | |
| INVENTOR(S) | : Cechan Tian et al. | |

It is certified that error appears in the above-identified patent and that said Letters Patent is hereby corrected as shown below:

Column 4, Line 66, after "signal" delete "$S_i$" and insert -- $S_1$ --.

Signed and Sealed this
Fourth Day of October, 2011

David J. Kappos
*Director of the United States Patent and Trademark Office*